May 20, 1952 G. H. LAGARDE ET AL 2,597,153
WELDING THROUGH PRESSURE
Filed March 14, 1949 3 Sheets-Sheet 2

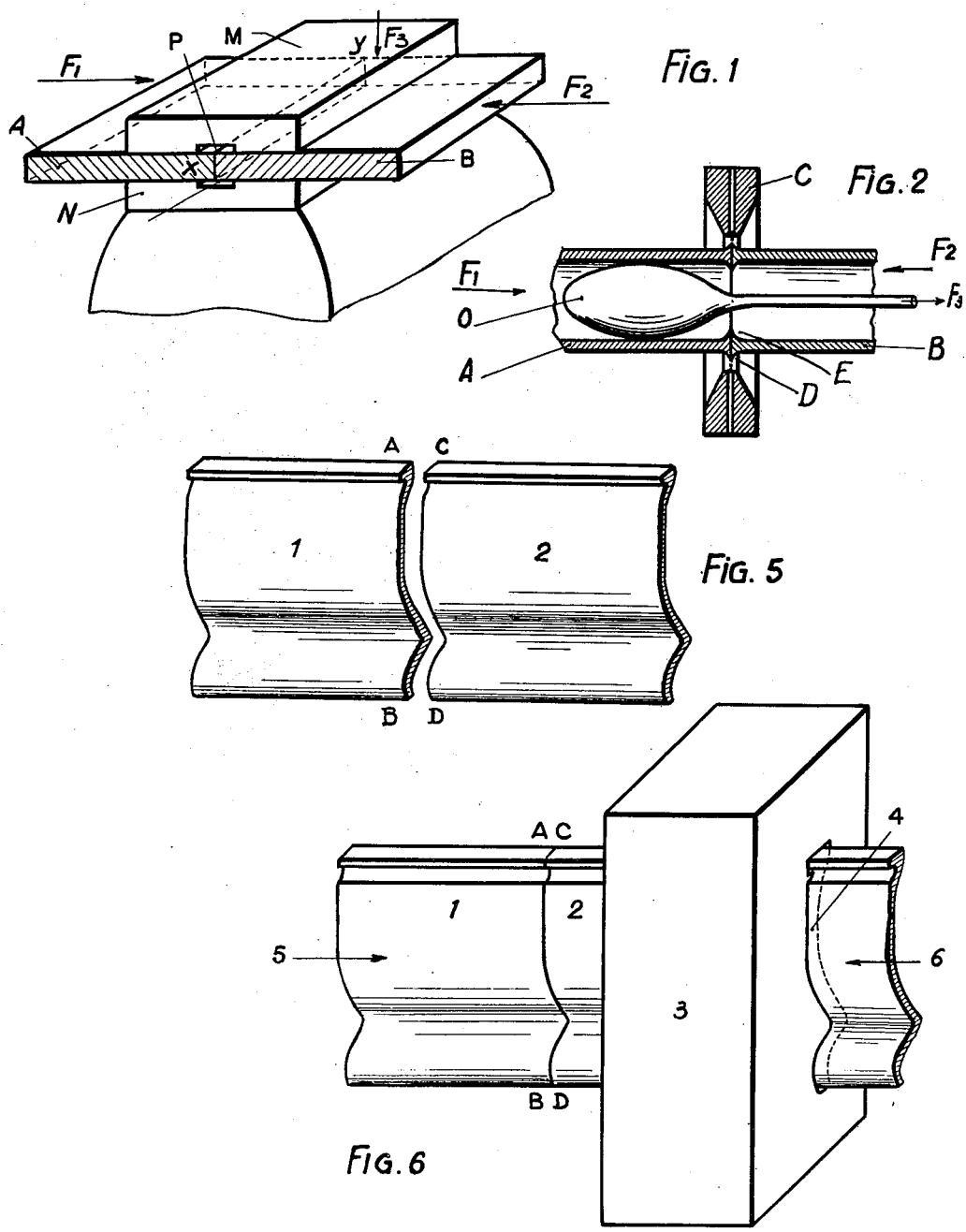

INVENTORS
GEORGES H. LAGARDE & JOSEPH BULOTA
BY
Young, Emery & Thompson
Attys.

UNITED STATES PATENT OFFICE 2,597,153

WELDING THROUGH PRESSURE

Georges Henri Lagarde, La Varenne, and Joseph Bulota, Saint Maur, France, assignors to L'Air Liquide, Societe Anonyme Pour l'Etude et l'Exploitation des Procedes Georges Claude, Paris, France Application March 14, 1949, Serial No. 81,354
In France April 3, 1948

2 Claims. (Cl. 78—84)

Our invention relates to the butt-welding of metal members, through pressure, and is carried out either by previous contacting of the edges and a subsequent heating, followed by a compression, or by heating of the edges previously spaced apart and subsequently forced against each other. As a heat supply, use is made of a flame such as an oxy-acetylene flame, or an electric current, such as induced current for instance. In these welding processes and when the edges of the pieces to be joined together have not been previously bevelled, the pressing of the metal made plastic by the heat, that is essential for the satisfactory interpenetration of the metallic particles in contact, causes the natural formation of a bead; the latter strengthens the welding and is used at the same time as an outlet for the impurities present in the joint, as it is explained in the U. S. patent application Serial No. 715,324 filed December 10, 1946, to which the present invention particularly refers, but in certain cases this bead is troublesome and has to be removed by a subsequent machining operation.

The object of the invention is to lessen and even to avoid the forming of this bead; it has been found, as a matter of fact, in the carrying out of the processes under discussion, that, by taking suitable precautions ensuring the expelling of the oxygen out of the seam, and more particularly by following the arrangements of the patent application referred to above, success has been attained in lowering to a very slight amount the included impurities. It is possible, therefore, without any trouble to decrease and even to cut out in practice this bead until there is obtained in the area of the seam only a very slight additional thickness of metal. For this purpose, the invention consists in the application, on the members to be welded at the place of the seam, at right angles to the welding pressure and at the moment when the latter is exerted, of a pressure restricting the natural formation of the bead.

When it is required to weld a seam of great length, for instance two metal plates, this restricting pressure may be exerted, after possible removal of the heating means, by a block acting through its own weight, or by a block pressed against the members through some external force; at the place of the seam the surface of this block in contact with this seam is provided with a slight groove if it is desired only to reduce any bead that might be formed naturally. In the case of butt-welding members such as bars, strip-iron, pipes, etc., this restricting pressure may be obtained merely by quickly bringing in around the members to be welded, at the place of the seam, a strong ring that may slide on said members with more or less play and that is withdrawn after the welding is completed. The reaction of this ring on the bead that has a tendency to form, takes the place of the pressure at right angles to that of welding to which reference is made above. If only the play is provided that is essential for the sliding of the ring over the members, there is formed only a slight additional thickness comprised in the range of the tolerances allowed in the working of the pieces by heating. The ring may be inserted between the member and the heating means, so that there is no necessity of removing the latter before the insertion of the ring. For butt-welding of hollow bodies, pipes for instance, the natural external bead may be reduced or cut out in practice by means of an outline ring, as has been stated, while the natural internal bead is reduced or cut out either by the presence at the place of the seam, at the instant when the welding pressure is exerted, of an oval-shaped member that may slide in the pipe with a more or less extensive amount of play, or by the insertion in the pipe, at the place of the seam, of a core that has for its outer diameter the internal diameter of the pipe and that is, preferably, made up of several portions in order to ease its withdrawal after welding, in spite of the contraction of the pipe due to cooling. Simultaneous use may be made, of course, on the same pipe, of the devices for reducing or eliminating the outer and inner natural beads. If desired, only one of the devices may be used.

In addition to the cutting-out of the beads that reduces the cost of subsequent machining, the invention possesses the advantage of improving the standard welding methods of this kind as follows:

(1) It ensures a better bending or centering of the members to be welded at the time of exerting the welding pressure which enables an appreciable increase to be made in the specific forcing pressure without having to fear the overlapping of these pieces.

(2) It makes a saving in metal, since the absence of the bead reduces the shortening of the pieces.

For the carrying out of the invention, mechanical, hydraulic, pneumatic, electric or electronic means may be provided for synchronizing the application of the welding pressure with the application of the pressure intended to prevent the forming of the bead, more particularly with the movement of insertion of the ring, the oval member or core mentioned above; these synchronizing means, or others, may be provided also for the heating controls and for the movements for the advance and withdrawal of the heating equipment.

The invention is adapted to all shapes of metal members to be welded by heating with a torch-flame and subsequently pressing, but the following disclosure has been restricted for the sake of greater simplicity, to the butt-welding of plates, sectional irons and pipes.

In the accompanying drawings:

Fig. 1 is a diagrammatic perspective view showing the butt-welding of two plates in accordance to the invention;

Fig. 2 is a diagrammatic cross-section of two pipes to be welded and shows a member movable inside said pipes for preventing the forming of an inner bead at the seam;

Fig. 5 is a perspective view showing two sectional irons arranged in alignment for butt-welding;

Fig. 6 is a perspective view showing means for preventing the forming of a bead in the butt-welding of the two sectional irons of Fig. 5.

In Fig. 1, there are shown two metal plates A and B to be welded along the line XY by making use of a heating torch (not shown) and by exerting a horizontal pressure in the direction of the arrows $F_1$ and $F_2$. The plates are arranged on a fixed block or mass N serving as an anvil; at the same time a vertical pressure is exerted in the direction of the arrow $F_3$ on the joint by means of the plate M serving as a flattener. The mass N may be provided with a groove O of which the depth corresponds to the additional thickness tolerated for the reduced bead; the plate M may be provided also with an exactly similar groove.

In Figure 2, the two pipe sections A and B are heated at the place of the seam by the circular torch C and, at the instant when the welding pressure is exerted along the direction of the arrows $F_1$ and $F_2$, there is a tendency for beads D and E to be formed at the outside and inside of the pipes; the bead on the inside is eliminated in practice through the passage of the oval-shaped piece O that moves with a minimum of play from left to right under the action of the pull shown diagrammatically by the arrow $F_3$.

Figure 3:
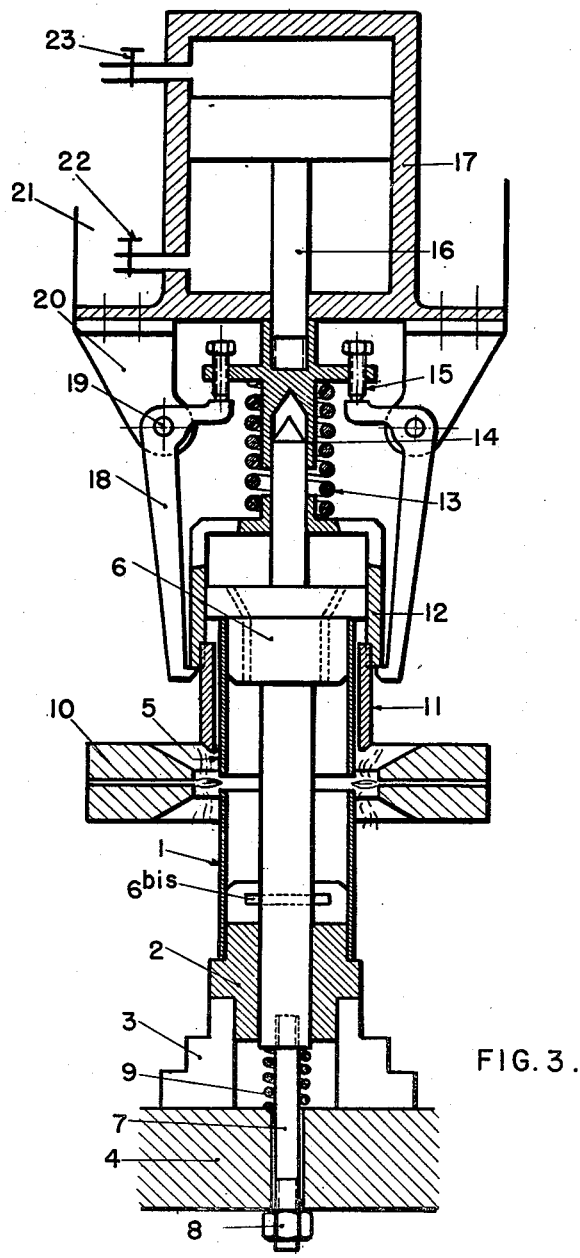
Figs. 3 and 4 show diagrammatically longitudinal sectional view of a device for preventing the forming of an external bead at the seam in the butt-welding of two pipes.
Figure 4:
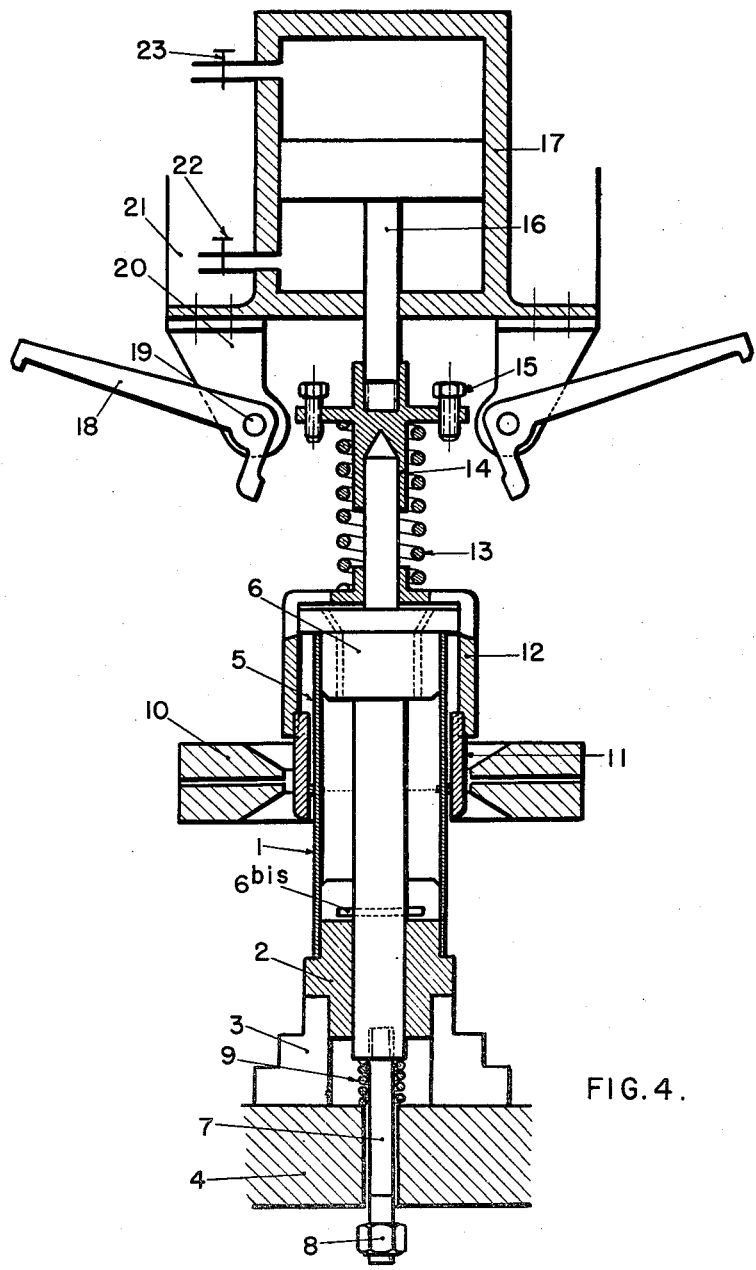

In Figure 3, the parts of the mechanism for the elimination of the natural outer bead on the pipe are in the position where they remain during the length of time of heating, the ring being held away from the seam, while in Figure 4, these parts are in the position where they are moved after heating and during the length of time of forcing or welding with the ring covering the seam.

In these two figures, the two pipe elements to be welded are respectively numbered 1 and 5; the ring preventing the forming in practice of the bead is shown at 11. This ring is made of hard steel, its width is provided so as to cover widely the area that may get out of shape. Its inner diameter is equal to the outer diameter of the pipe increased by the play that is just required to allow it to slide. The ring is screwed in the ring-holder 12 that slides over the movable pipe-holder 6. A spring 13 compressed between the ring-holder and the head 14 ensures at the right moment the bringing into position of the ring over the welding area of the pipe. The head 14 fixed rigidly with the rod of the piston 16 carries two contact screws 15. This head guides the spring and the movable pipe-holder. The sequence of operations is regulated by suitably adjusting the distance between the nose of the movable pipe-holder 6 and the head of its corresponding housing (center of the piece 14). Two bell-crank levers 18 pivot about the fixed studs 19, and hold by means of their claws the ring-holder 18 in the required position during the entire length of time of the heating. A press 17 furnished with two cocks 22 and 23 applies the forcing pressure. A burner 10, with slots or holes, ensures the heating of the edge of the pipes.

On the other hand, in Figure 3 are shown the fixed pipe 1, a fixed pipe-holder 2, the jaws 3, the mandrel 4, the movable pipe 5, the movable pipe-holder 6 fixed rigidly with the spindle 7 held by a nut 8 that, acting in conjunction with the spring 9, enables the required adjustment to be obtained of the spacing between the two edges to be welded.

The operation of the equipment is as follows: of the two pipe elements, reduced to short sections to simplify the disclosure, pipe 1 remains fixed, in this sense that it cannot move laterally but may be rotated about its axis. The other pipe element 5 may be moved in a direction parallel with its axis so as to be brought into contact with the pipe 1 at the suitable instant and forced strongly against it. The burner 10 is arranged so that its flames may heat uniformly the two edges of the pipes. The whole assembly is in the position of Figure 3.

First of all the burner is lighted. A rotary movement is imparted to the pipes in order to make the heating uniform. When a suitable temperature is reached, the cock 23 is opened thus admitting into the ram the fluid under pressure. The cock 22 is obviously opened and communicates with the outside air. The piston rod 16 is set in movement. After travelling the required distance, the screws 15 cause the levers 18 to turn by a sufficient amount so that the claws draw apart from the ring-holder and leave the latter to the action of the spring that was compressed. The ring is suddenly driven over the seam (see Figure 4) while the piston, by carrying on its travel, transmits the pressure to which it is subjected on the nose of the movable pipe-holder and thus ensures the pressing of the heated metal.

It is obvious that at the same moment suitable devices may draw apart or withdraw the burner, and put out the flames. But this arrangement is not entirely essential as the ring possibly may be inserted between the pipe and the burner.

Figure 3 shows that the mechanical arrangements taken for the movement of the ring in relation to the pipe ensure for the latter, and consequently for the welding, the greatest possible degree of self-centering. On the other hand, the presence of the ring does not allow the hottest portion of the metal to form a thick bead at the time of pressing; the consequence of this is that less metal is consumed, since the bead is appreciably reduced so that only a slight additional thickening of metal is effected in the welding area.

Finally, the restraining effect of the ring, preventing the flow of the more viscous metal, enables pressures to be exerted that are much higher than when no ring is present. It has been feasible for instance to reach pressures of 9 kgs. per square millimetre of cross section of welded metal, while normally the pressure is restricted to 3 kgs. per square millimetre. It is quite obvious that this increase in pressure improves appreciably the quality of the seam and its uniformity. The bead that, with the customary processes, reaches a height of about 4 mm. on a pipe of 56/60 mm., is avoided in practice and is replaced by an additional thickness of 0.4 mm., that is to say within the range of tolerances allowed in the working of pieces by heating.

As stated above, the invention may be applied to welding seams on members possessing comparatively intricate outlines. Figure 5 provides an example of this kind. The sectional iron members or bars 1 and 2 have to be joined together by welding along joint surfaces AB and CD.

If use is made of the welding method with previous contact, the members are brought into the position of Figure 6. A restraining block 3 that is provided with a mortise shaped like the outline of the section, with of course the required amount of play, is made to cover the line of welding at the moment when the strong pressure, represented by the arrows 5 and 6, begins to have effect.

To ease its withdrawl, the ring, in certain cases, may be built up of several parts surrounded by an outer housing.

What we claim is:

1. In a device for the butt-welding of metal pipes, in combination, a fixed support for one of the pipes to be welded, a movable support slidably arranged relatively to said fixed support for supporting and axially moving the other pipe in alignment with the first one, a spring adapted to rearwardly urge the movable support, a stop on said movable support to determine its rear position, a welding torch surrounding the pipes at the places of the edges to be welded, a ring surrounding the pipe mounted on the movable support, means for supporting and guiding said ring along said movable support coaxially to the pipes, a power actuated reciprocating member arranged coaxially to the pipes and adapted to engage said movable support upon being moved towards the latter, a compression spring interposed between said ring and the power actuated reciprocating member, means for locking the ring in its rear position, stop members provided on said power actuated reciprocating member and adapted to operate said locking means for releasing the ring upon the power actuated member being moved towards the movable support for engaging the same.

2. In a device for the butt-welding of metal pipes, in combination, a fixed support for one of the pipes to be welded, a movable support slidably arranged relatively to said fixed support for supporting and axially moving the other pipe in alignment with the first one, a spring adapted to rearwardly urge the movable support, a stop on said movable support to determine its rear position, a welding torch surrounding the pipes at the place of the pipe edges to be welded, a power actuated reciprocating member in alignment with the movable support and adapted to engage said movable support upon being moved toward the latter for pressing together the edges to be welded, a ring surrounding the pipe mounted on the movable support, means for supporting and guiding said ring along said movable support coaxially to the pipes, a head member interposed between the power actuated reciprocating member and adapted to freely slide along the movable support before engaging the latter, a compression spring interposed between said head member and the ring, levers pivoted at fixed points and adapted to lock said ring in its rear position, stop members provided on the head member and adapted to engage said levers for releasing the ring upon the power actuated member being moved towards the movable support for engaging the same.

GEORGES HENRI LAGARDE.
JOSEPH BULOTA.

REFERENCES CITED

The following references are of record in the file of this patent:

UNITED STATES PATENTS

| Number | Name | Date |
|---|---|---|
| 549,711 | Farrensteiner | Nov. 12, 1895 |
| 756,141 | Renner | Mar. 29, 1904 |
| 790,470 | Woodrum | May 23, 1905 |
| 972,928 | Schneider | Oct. 18, 1910 |
| 1,679,701 | Wysong | Aug. 7, 1928 |